US012802279B2

(12) United States Patent
Vaidyanathan et al.

(10) Patent No.: US 12,802,279 B2
(45) Date of Patent: Nov. 17, 2026

(54) TRANSCODING COMPRESSED TEXTURE SETS TO TEXTURES WITH A HARDWARE-SUPPORTED COMPRESSION FORMAT

(71) Applicant: NVIDIA Corporation, Santa Clara, CA (US)

(72) Inventors: Karthik Vaidyanathan, Oakland, CA (US); Marco Salvi, Seattle, WA (US); Bartlomiej Wronski, Brooklyn, NY (US); Tomas Akenine-Moller, Lund (SE); Johan Pontus Ebelin, Lund (SE); Aaron Eliot Lefohn, Kirkland, WA (US); John Matthew Burgess, Austin, TX (US); Steven James Heinrich, Madison, AL (US); Michael Alan Fetterman, Lancaster, MA (US); Shirish Gadre, Fremont, CA (US); Mark Alan Gebhart, Round Rock, TX (US); Yury Uralsky, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 286 days.

(21) Appl. No.: 18/661,448

(22) Filed: May 10, 2024

(65) Prior Publication Data

US 2024/0378792 A1 Nov. 14, 2024

Related U.S. Application Data

(60) Provisional application No. 63/466,206, filed on May 12, 2023.

(51) Int. Cl.

*G06T 9/00* (2006.01)
*G06T 15/00* (2011.01)

(Continued)

(52) U.S. Cl.

CPC .............. *G06T 9/00* (2013.01); *G06T 15/005* (2013.01); *G06T 15/04* (2013.01); *G06V 10/44* (2022.01); *H04N 19/40* (2014.11); *H04N 19/91* (2014.11)

(58) Field of Classification Search

None

See application file for complete search history.

(56) References Cited

U.S. PATENT DOCUMENTS

| | | | | |
|---|---|---|---|---|
| 2011/0032251 | A1 | 2/2011 | Pothana | |
| 2013/0229422 | A1 * | 9/2013 | Harris | G06T 1/60<br>345/522 |

(Continued)

OTHER PUBLICATIONS

Park et al., "DeepSDF: Learning Continuous Signed Distance Functions for Shape Representation," CVPR, 2019, pp. 165-174.

(Continued)

*Primary Examiner* — Peter Hoang

(74) *Attorney, Agent, or Firm* — Zilka-Kotab, P.C.

(57) ABSTRACT

In computer graphics, texture refers to a type of surface, including the material characteristics, that can be applied to an object in an image. A texture may be defined using numerous parameters, such as color(s), roughness, glossiness, etc. In some implementations, a texture may be represented as an image that can be placed on a three-dimensional (3D) model of an object to give surface details to the 3D object. To reduce a size of textures (e.g. for storage and transmission), textures in a texture set may be compressed together. The present disclosure provides for transcoding a compressed texture set to textures with a hardware-supported compression format.

51 Claims, 11 Drawing Sheets

(51) Int. Cl.

| | |
|---|---|
| ***G06T 15/04*** | (2011.01) |
| ***G06V 10/44*** | (2022.01) |
| ***H04N 19/40*** | (2014.01) |
| ***H04N 19/91*** | (2014.01) |

(56) References Cited

U.S. PATENT DOCUMENTS

| | | | |
|---|---|---|---|
| 2019/0251734 A1 | 8/2019 | Li et al. | |
| 2019/0304140 A1 | 10/2019 | Fuller et al. | |
| 2020/0051287 A1* | 2/2020 | Wihlidal | G06T 7/11 |
| 2022/0392140 A1 | 12/2022 | Akenine-Moller et al. | |
| 2024/0257405 A1 | 8/2024 | Vaidyanathan et al. | |
| 2024/0378759 A1 | 11/2024 | Vaidyanathan et al. | |
| 2025/0272783 A1 | 8/2025 | Farhadzadeh et al. | |
| 2026/0065056 A1 | 3/2026 | Lefohn et al. | |

OTHER PUBLICATIONS

Paszke et al., "PyTorch: An Imperative Style, High-Performance Deep Learning Library," 33rd Conference on Neural Information Processing Systems (NeurIPS), 2019, pp. 1-12.
Perkins et al., Virtual Production in Action: A Creative Implementation of Expanded Cinematography and NarrativesACM SIGGRAPH Posters, Article 21, 2022, 2 pages, retrieved from https://history.siggraph.org/learning/virtual-production-in-action-a-creative-implementation-of-expanded-cinematography-and-narratives-by-perkins-and-echeverry/.
Pranckevicius, A., "Texture Compression in 2020," Blog, Dec. 8, 2020, 16 pages, retrieved from https://aras-p.info/blog/2020/12/08/Texture-Compression-in-2020/.
Rippel et al., "Real-Time Adaptive Image Compression," Proceedings of the 34th International Conference on Machine Learning, PMLR, 2017, 9 pages, retrieved from https://proceedings.mlr.press/v70/rippel17a.html.
Roimela et al., "Efficient High Dynamic Range Texture Compression," ACM Transactions on Graphics , vol. 25, Jul. 2006, pp. 8 pages. retrieved from https://www.researchgate.net/publication/220183464_High_dynamic_range_texture_compression.
Skodras et al., "The JPEG 2000 Still Image Compression Standard," IEEE Signal Processing Magazine, Sep. 2001, pp. 36-58.
Strom et al., "iPACKMAN: High-Quality, Low-Complexity Texture Compression for Mobile Phones," Graphics Hardware, 2005, 9 pages.
Strom et al., "ETC2: Texture Compression using Invalid Combinations," Graphics Hardware, 2007, 7 pages.
Takikawa et al., "Variable Bitrate Neural Fields," SIGGRAPH '22 Conference Proceedings, Aug. 7-11, 2022, pp. 1-10.
Tancik et al., "Fourier Features Let Networks Learn High Frequency Functions in Low Dimensional Domains," 34th Conference on Neural Information Processing Systems (NeurIPS), 2020, pp. 1-11.
Tartarchuk et al., "Advances in Real-Time Rendering in Games: Part I," SIGGRAPH, 2022, 9 pages, retrieved from https://advances.realtimerendering.com/s2022/index.html.
Tartarchuk et al., "Advances in Real-Time Rendering in Games: Part I," SIGGRAPH, 2021, 16 pages, retrieved from https://advances.realtimerendering.com/s2021/.
Tewari et al., "Advances in Neural Rendering," EUROGRAPHICS, 2022, 33 pages, retrieved from https://arxiv.org/pdf/2111.05849.
Theis et al., "Lossy Image Compression with Compressive Autoencoders," ICLR, 2017, pp. 1-19.
Thies et al., "Deferred Neural Rendering: Image Synthesis using Neural Textures," SIGGRAPH, 2019, 12 pages, retrieved from https://arxiv.org/abs/1904.12356.
Thomas et al., "Temporally Stable Real-Time Joint Neural Denoising and Supersampling," Proceedings of the ACM on Computer Graphics and Interactive Techniques, vol. 5, Jul. 2022, pp. 1-22.
Trowbridge et al., "Average Irregularity Representation of a Rough Surface for Ray Reflection," Journal of the Optical Society of America, vol. 65, No. 5, May 1975, pp. 531-536.
Ulyanov et al., "Deep Image Prior," IEEE Conference on Computer Vision and Pattern Recognition, 2018, pp. 9446-9454.
Van Den Oord et al., "Neural Discrete Representation Learning," 31st Conference on Neural Information Processing Systems (NIPS), 2017, pp. 1-10.
Vaswani et al., "Attention Is All You Need," 31st Conference on Neural Information Processing Systems (NIPS), 2017, pp. 1-11.
Wallace, G., "The JPEG Still Picture Compression Standard," Communications of the ACM, vol. 34, No. 4, Apr. 1991, pp. 31-44.
Wang et al., "Image Quality Assessment: From Error Visibility to Structural Similarity,". IEEE Transactions on Image Processing, vol. 13, No. 4, Apr. 2004, pp. 1-14.
Wikipedia, "S3 Texture Compression," Wikipedia, 2024, 6 pages, retrieved from https://en.wikipedia.org/wiki/S3_Texture_Compression.
Wolfe et al., "Spatiotemporal Blue Noise Masks," Eurographics Symposium on Rendering, 2022, 10 pages.
Yan et al., "Demystifying Tensor Cores to Optimize Half-Precision Matrix Multiply," IEEE International Parallel and Distributed Processing Symposium, 2020, 10 pages, retrieved from https://www.semanticscholar.org/paper/Demystifying-Tensor-Cores-to-Optimize-Matrix-Yan-Wang/ed32fef79581afa6c33a3afe34c2ee723156a055.
Yang et al., "A Survey of Temporal Antialiasing Techniques," Eurographics, vol. 39, No. 2, 2020, 15 pages.
Zhang et al., "The Unreasonable Effectiveness of Deep Features as a Perceptual Metric," CVPR, 2018, pp. 586-595, retrieved from https://openaccess.thecvfcom/content_cvpr_2018/papers/Zhang_The_Unreasonable_Effectiveness_CVPR_2018_paper.pdf.
Zontak et al., "Internal Statistics of a Single Natural Image," CVPR, 2011, pp. 977-984, retrieved from https://www.wisdom.weizmann.acil/~vision/SingleImageStatistics/Zontak_Irani_CVPR2011.pdf.
Delp et al., "Image Compression Using Block Truncation Coding," IEEE Transactions on Communications, Oct. 1979, pp. 1335-1342.
Vaidyanathan et al., U.S. Appl. No. 18/420,625, filed Jan. 23, 2024.
Vaidyanathan et al., U.S. Appl. No. 18/661,421, filed May 10, 2024.
Wronski, B., "Dimensionality reduction for image and texture set compression," Blog, May 21, 2020, 31 pages.
Wronski, B., "Neural material (de)compression—data-driven nonlinear dimensionality reduction," Blog, May 30, 2021, 16 pages, retrieved from https://bartwronski.com/2021/05/30/neural-material-decompression-data-driven-nonlinear-dimensionality-reduction/.
Alakuijala et al., "Guetzli: Perceptually Guided JPEG Encoder," Google Research Europe, Mar. 14, 2017, 13 pages, retrieved from https://arxiv.org/abs/1703.04421.
Alakuijala et al., "JPEG XL next-generation image compression architecture and coding tools," Applications of Digital Image Processing XLII, vol. 11137, Sep. 6, 2019, 13 pages, retrieved from https://doi.org/10.1117/12.2529237.
Andersson et al., "FLIP: A Difference Evaluator for Alternating Images," Proceedings of the ACM on Computer Graphics and Interactive Techniques, vol. 3, No. 2, Aug. 2020, 23 pages.
Arcila, T., "FidelityFX Super Resolution 2.0," Game Developers Conference, 2022, 3 pages, retrieved from https://bh.gdcvault.com/play/1027829/FidelityFX-Super-Resolution-2-0.
Balle et al., "End-to-end Optimized Image Compression," ICLR, 2017, pp. 1-27.
Balle et al., "Nonlinear Transform Coding," preprint accepted for IEEE Journal of Selected Topics in Signal Processing, 2020, pp. 1-17, retrieved from https://arxiv.org/abs/2007.03034.
Balle et al., "Variational Image Compression with a Scale Hyperprior," ICLR, 2018, pp. 1-47.
Blau et al., "The Perception-Distortion Tradeoff," IEEE Conference on Computer Vision and Pattern Recognition, 2018, pp. 6228-6237, retrieved from https://openaccess.thecvfcom/content_cvpr_2018/papers/Blau_The_Perception-Distortion_Tradeoff_CVPR_2018_paper.pdf.
Bross et al., "Overview of the Versatile Video Coding (VVC) Standard and Its Applications," IEEE Transactions on Circuits and Systems for Video Technology, vol. 31, No. 10, Oct. 2021, pp. 3736-3764.
Burley et al., "Physically Based Shading at Disney," ACM SIGGRAPH, 2012, 27 pages, retrieved from https://disneyanimation.com/publications/physically-based-shading-at-disney/.

(56) References Cited

OTHER PUBLICATIONS

Campbell et al., "Two Bit/Pixel Full Color Encoding," Computer Graphics (SIGGRAPH), 1986, pp. 215-223.
Chambon et al., "Passing Multi-Channel Material Textures to a 3-Channel Loss," ACM SIGGRAPH Talks, Aug. 2021, 2 pages.
Chen et al., "An Overview of Core Coding Tools in the AV1 Video Codec," IEEE Picture Coding Symposium (PCS), 2018, 6 pages, retrieved from https://www.researchgate.net/publication/327489524_An_Overview_of_Core_Coding_Tools_in_the_AV1_Video_Codec.
Cheng et al., "Learned Image Compression with Discretized Gaussian Mixture Likelihoods and Attention Modules," CVPR, 2020, pp. 7939-7948.
Courreges, A., "Graphics Studies Compilation," Blog, Dec 29, 2020, 12 pages, retrieved from https://www.adriancourreges.com/blog/2020/12/29/graphics-studies-compilation/.
Fenny et al., "Texture Compression using Low-Frequency Signal Modulation," Graphics Hardware, 2003, 10 pages.
Hasselgren et al., "Neural Temporal Adaptive Sampling and Denoising," Computer Graphics Forum, Proceedings of Eurographics, 2020, 9 pages, retrieved from https://research.nvidia.com/publication/2020-05_neural-temporal-adaptive-sampling-and-denoising.
He et al., "Slang: language mechanisms for extensible real-time shading systems," ACM Transactions on Graphics, vol. 37, No. 4, Aug. 2018, pp. 1-13.
Hendrycks et al., "Gaussian Error Linear Units (GELUs)," arXiv, 2018, pp. 1-9, retrieved from https://arxiv.org/pdf/1606.08415v3.
Hofmann et al., "Interactive Path Tracing and Reconstruction of Sparse Volumes," Proceedings of the ACM on Computer Graphics and Interactive Techniques, vol. 4, No. 1, May 2021, pp. 1-19.
Hornik, K., "Multilayer Deedforward Networks are Universal Approximators," Neural Networks, vol. 02, pp. 359-366, 1989.
Howard et al., "Searching for MobileNetV3," ICCV, 2019, pp. 1314-1324, retrieved from https://openaccess.thecvf com/content_ICCV_2019/papers/Howard_Searching_for_MobileNetV3_ICCV_2019_paper.pdf.
Geldreich et al., "basis_universal, Basis Universal Supercompressed GPU Texture Codec," GutHub, 2023, 13 pages, retrieved from https://github.com/BinomialLLC/basis_universal.
Barczak et al., "InteIR Arc Graphics Developer Guide for Real-Time Ray Tracing in Games," Intel Developer Guide, 2023, 29 pages.
Jacob et al., "Quantization and Training of Neural Networks for Efficient Integer-Arithmetic-Only Inference," CVPR, 2018, pp. 2704-2713, retrieved from https://openaccess.thecvfcom/content_cvpr_2018/papers/Jacob_Quantization_and_Training_CVPR_2018_paper.pdf.
Kawiak et al., "Intel Xe Super Sampling (XeSS)—an Al-based Upscaling for Real-Time Rendering," Powerpoint Presentation at Game Developers Conference, Mar. 24, 2022, 27 pages.
Kingma et al., "Adam: A Method for Stochastic Optimization," ICLR, 2015, pp. 1-9.
Knittel et al., "Hardware for Superior Texture Performance" Eurographics, EGGH/SIGGRAPH, 1995, 8 pages.
Kuznetsov et al., "NeuMIP: Multi-Resolution Neural Materials," ACM Transactions on Graphics, vol. 40, No. 4, Aug. 2021, 13 pages.
Ledig et al., "Photo-Realistic Single Image Super-Resolution Using a Generative Adversarial Network," CVPR, 2017, pp. 4681-4690, retrieved from https://openaccess.thecvfcom/content_cvpr_2017/papers/Ledig_Photo-Realistic_Single_Image_CVPR_2017_paper.pdf.
Liu et al., "Non-local Attention Optimized Deep Image Compression," arXiv, 2019, pp. 1-10, retrieved from https://arxiv.org/pdf/1904.09757.
Lombardi et al., "Neural Volumes: Learning Dynamic Renderable vols. from Images," ACM Transactions on Graphics, vol. 38, No. 4, Jul. 2019, 14 pages.
Loshchilov et al., "SGDR: Stochastic Gradient Descent with Warm Restarts," ICLR, 2017, pp. 1-16.
Mentzer et al., "High-Fidelity Generative Image Compression," 34th Conference on Neural Information Processing Systems (NeurIPS), 2020, pp. 1-12.
White et al., "Texture Block Compression in Direct3D 11," Microsoft Learn, Aug. 19, 2020, 5 pages, retrieved from https://learn.microsoft.com/en-US/windows/win32/direct3d11/texture-block-compression-in-direct3d-11.
Mildenhall et al., "NeRF: Representing Scenes as Neural Radiance Fields for View Synthesis," Communications of the ACM, vol. 65, No. 1, Jan. 2022, pp. 99-106.
Muller et al., "Instant Neural Graphics Primitives with a Multiresolution Hash Encoding," ACM Transactions on Graphics, vol. 41, No. 4, Jul. 2022, pp. 1-15.
Muller et al., "Real-time Neural Radiance Caching for Path Tracing," ACM Transactions on Graphics, vol. 40, No. 1, Aug. 2021, pp. 1-16.
Munkberg et al., "High Dynamic Range Texture Compression for Graphics Hardware," ACM Transactions on Graphics, 2006, 9 pages, retrieved from https://fileadmin.cs.Ith.se/graphics/research/papers/hdrtexture2006/hdr_tcpdf.
Narkowicz, K., "Aces Filmic Tone Mapping Curve," WordPress, Blog, Jan. 6, 2016, 8 pages, retrieved from https://knarkowicz.wordpress.com/2016/01/06/aces-filmic-tone-mapping-curve/.
Neubelt et al., "Crafting a Next-Gen Material Pipeline for The Order: 1886," SIGGRAPH 2013 Course: Physically Based Shading in Theory and Practice, 2013, 29 pages, retrieved from https://blog.selfshadow.com/publications/s2013-shading-course/.
NVIDIA, "NVVM IR Specification," NVIDIA Corp., 2024, 61 pages, retrieved from https://docs.nvidia.com/cuda/nvvm-ir-spec/index.html.
NVIDIA, "CUDA C++ Programming Guide," NVIDIA Corp., 2024, 613 pages, retrieved from https://docs.nvidia.com/cuda/cuda-c-programming-guide/.
Rusch et al., "Improve Shader Performance and In-Game Frame Rates with Shader Execution Reordering," NVIDIA Developer Technical Blog, Oct. 12, 2022, 7 pages, retrieved from https://developer.nvidia.com/blog/improve-shader-performance-and-in-game-frame-rates-with-shader-execution-reordering/.
Nystad et al., "Adaptive Scalable Texture Compression," High Performance Graphics, 2012, pp. 105-114.
Ouyang et al., "ReSTIR GI: Path Resampling for Real-Time Path Tracing," High-Performance Graphics, vol. 40, No. 8, 2021, 13 pages.
Non-Final Office Action from U.S. Appl. No. 18/420,625, dated Dec. 31, 2025.
Garigapati, K., "Pyramid Level Lossy Image Compression preserving Crucial Details, Things to Know," GitHub, 2020, 8 pages, retrieved from https://kalyan0510.github.io/posts/ppyramidcnncompression.html.
Farhadzadeh et al., "Neural Graphics Texture Compression Supporting Random Access," ECCV, 2024, pp. 412-429.
Restriction Requirement from U.S. Appl. No. 18/661,421, dated Mar. 18, 2026.
Notice of Allowance from U.S. Appl. No. 18/420,625, dated Apr. 30, 2026.
Non-Final Office Action from U.S. Appl. No. 18/661,421, dated Jun. 12, 2026.

* cited by examiner

TRANSCODING COMPRESSED TEXTURE SETS TO TEXTURES WITH A HARDWARE-SUPPORTED COMPRESSION FORMAT

CLAIM OF PRIORITY

This application claims the benefit of U.S. Provisional Application No. 63/466,206 titled "RANDOM-ACCESS NEURAL COMPRESSION OF MATERIAL TEXTURES," filed May 12, 2023, the entire contents of which is incorporated herein by reference.

TECHNICAL FIELD

The present disclosure relates to texture decompression for computer graphics.

BACKGROUND

In computer graphics, texture refers to a type of surface, including the material characteristics, that can be applied to an object in an image. A texture may be defined using numerous parameters, such as color(s), roughness, glossiness, etc. In some implementations, a texture may be represented as an image that can be placed on a three-dimensional (3D) model of an object to give surface details to the 3D object. Textures can accordingly be used to provide photorealism in computer graphics, but they also have certain storage, bandwidth, and memory demands. Thus, limited disk storage, download bandwidth, and memory size constraints must be addressed to continuously improve photorealism in computer graphics via more detailed and available textures.

As a solution to reduce these resource demands, textures can be compressed (i.e. reduced in size using some preconfigured compression algorithm) prior to storage and/or network transmission. However, current texture compression methods are lacking. For example, traditional block-based texture compression methods, which rely on fixed sized blocks, are designed only for moderate compression rates. Block-based compression methods are also limited in the number of material properties that can be compressed together per texture, and as a result require multiple textures to cover all the desired material properties.

Neural image compression, which has been introduced more recently for compressing textures, incorporates non-linear transformations in the form of neural networks to aid compression and decompression. Neural image compression methods require large-scale image data sets and expensive training. They are also not suitable for real-time rendering because of their lack of random access and their inability to compress non-color material properties and a high decompression cost.

There is thus a need for addressing these issues and/or other issues associated with the prior art.

SUMMARY

A method, computer readable medium, and system are disclosed to transcode a compressed texture set to textures with a hardware-supported compression format. At least a portion of a single texture representation of a plurality of textures in a set of textures is transcoded into at least a portion of the plurality of textures with a hardware-supported compression format. The at least a portion of the plurality of textures with the hardware-supported compression format is output.

DETAILED DESCRIPTION

Figure 1:
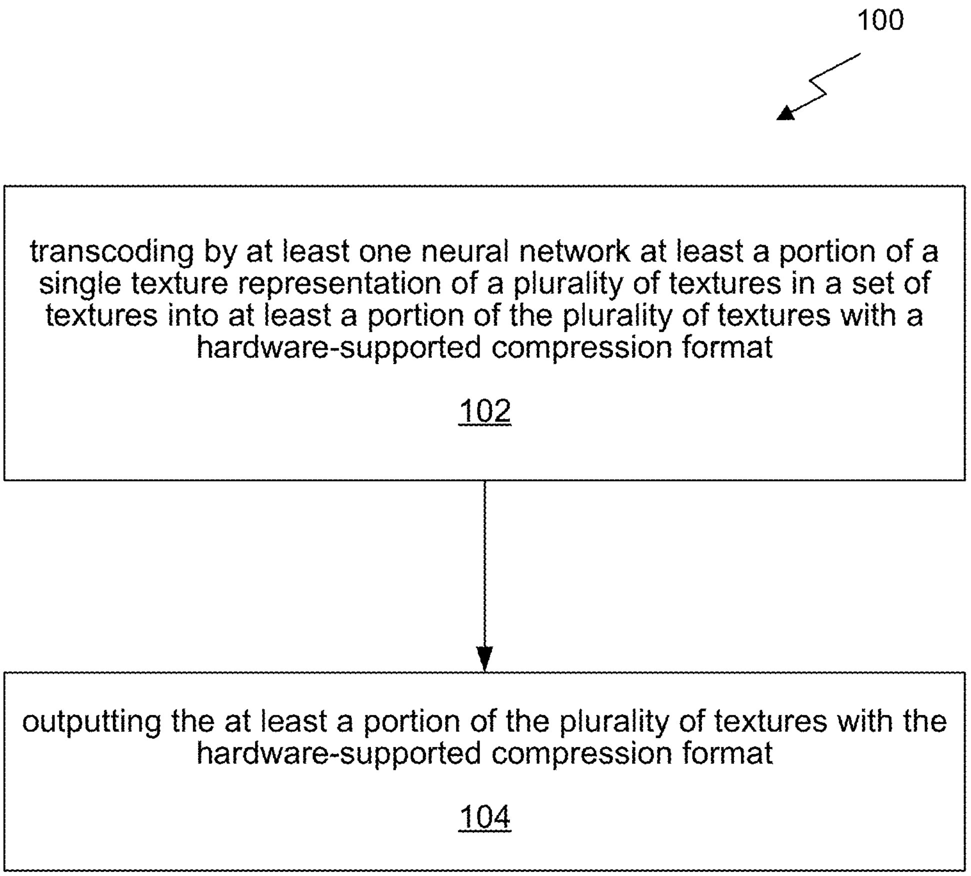
FIG. 1 illustrates a flowchart of a method for transcoding a compressed texture set to textures with a hardware-supported compression format, in accordance with an embodiment.

FIG. 1 illustrates a flowchart of a method 100 for transcoding a compressed texture set to textures with a hardware-supported compression format, in accordance with an embodiment. The method 100 may be performed by a device, which may be comprised of a processing unit, a program, custom circuitry, or a combination thereof, in an embodiment. In another embodiment, a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100.

In operation 102, at least a portion of a single texture representation of a plurality of textures in a set of textures is transcoded by at least one neural network into at least a portion of the plurality of textures with a hardware-supported compression format. With respect to the present description, a texture refers to a data representation of at least one property of an object surface. The data representation may be in two-dimensions (2D), three-dimensions (3D) [e.g. 2D with also a time dimension, or volumetric], four-dimensions (4D) [e.g. volumetric with also a time dimension), or in other embodiments even a greater number of dimensions. The property(ies) may be of a physical material (e.g. metal, wood, ceramic, glass, etc.), in an embodiment. In various examples, each property may indicate ambient occlusion, roughness, metalness, diffuse color, normals maps, height maps, glossiness, other Bidirectional Reflectance Distribution Function (BRDF) information, subsurface scattering properties, anisotropy, transmittance, etc.

In an embodiment, the texture may be represented as an image. The texture can be applied to a surface of an object (e.g. in an image) to give surface details to the object. The object may be a 2D object or a 3D object.

As mentioned, the present operation 102 relates to transcoding a single texture representation of a set of textures. In an embodiment, the set of textures may include a plurality of textures. In an embodiment, the set of textures (or "texture set") may represent a (particular) material. For example, each texture in the texture set may represent a different property of the material. In an embodiment, the textures in the texture set may be layered or otherwise combined to represent a specific material, such that when applied to an object the surface of the object appears to be of the material.

In an embodiment, at least one texture in the texture set may include a plurality of channels. In this embodiment, each channel of the texture may store data for a different property of the object surface. Thus, as noted above, each texture may store one or more properties of the object surface. Of course, in other embodiments, at least one texture in the texture set may include a single channel.

The single texture representation refers to a single data structure that has been generated to represent the set of textures. In an embodiment, the single texture representation may be a compressed representation of a plurality of textures included in the set of textures. The single texture representation may be smaller in size (memory-wise) than the original texture set.

In an embodiment, the single texture representation may be generated by exploiting correlations (e.g. redundancies) across the plurality of textures in the texture set and/or across a plurality of channels of the plurality of textures in the texture set. In embodiments, the single texture representation may be generated by exploiting correlations spatially across each texture in the set of textures and/or across mip levels. In general, exploiting correlations refers to at least partially reducing the correlated (e.g. redundant) data during compression.

In an embodiment, the single texture representation may be generated using at least one compression method. In another embodiment, the single texture representation may be generated using at least two compression methods. In an embodiment, the single texture representation may be learned using a neural network. In another embodiment, the single texture representation may be further generated by applying an entropy encoding to an output of the neural network. One exemplary embodiment of generating a compressed representation of a plurality of textures included in a set of textures is disclosed in U.S. application Ser. No. 18/420,625, filed Jan. 23, 2024 and entitled "COMPRESSION OF TEXTURE SETS USING A NON-LINEAR FUNCTION AND QUANTIZATION," which is hereby incorporated by reference in its entirety.

In an embodiment, the single texture representation may be a pyramid of a plurality of feature levels, where each feature level of the plurality of feature levels includes a plurality of grids, which may be in 2D, 3D, etc. corresponding to the dimensions of the original textures. In an embodiment, the grids may store data that can be used during the transcoding of operation 102. An embodiment of the pyramid structure of the single texture representation will be described in more detail below with reference to FIG. 3.

Returning to operation 102, at least a portion of the single texture representation is transcoded by at least one neural network into at least a portion of the plurality of textures with a hardware-supported compression format. Transcoding refers to directly converting from the single texture representation to the hardware-supported compression format. In an embodiment, the transcoding may be performed using a single neural network, for example as disclosed in detail below with reference to FIG. 4. In an embodiment, the transcoding may be performed using at least two neural networks, for example as disclosed in detail below with reference to FIG. 5. In an embodiment, at least two different portions of the single texture representation may be transcoded to at least two different portions of the plurality of textures with a same hardware-supported compression format. In an embodiment, at least two different portions of the single texture representation may be transcoded to at least two different portions of the plurality of textures with different hardware-supported compression formats.

In an embodiment, the hardware-supported compression format is a block compression format, which may be a select (e.g. predefined, predicted, determined, etc.) block compression format. BCx (e.g. BC1-BC7) are exemplary block compression formats, while other block compression formats may include ETx (e.g. ETC1-ETC2), ASTC, etc. In an embodiment, the hardware-supported compression format may be a compression format that is supported by hardware that performs rendering. A compression format is supported by the hardware when the hardware is configured to be able to decompress data in the compression format. In the present embodiment, the single texture representation may be in a format that is not supported by the hardware (i.e. that cannot be directly decompressed by the hardware). Thus, transcoding the single texture representation to textures in the hardware-supported compression format allows the hardware to be able to utilize the textures. With respect to the present description, the hardware may be a processing unit, such as a graphics processing unit (GPU) or a special-purpose hardware.

In an embodiment, the single texture representation, such as in the pyramid format mentioned above, may enable random access such that only a portion (i.e. less than an entirety) of the single texture representation is transcoded. In some embodiments, this portion may be a texel, a block of texels, or another rectangular part of a 2D texture set or may be a 3D box within a 3D texture set. In another embodiment, an entirety of the single texture representation may be transcoded.

In an embodiment, the transcoding may be performed at load time when loading graphics data to memory for use by a processing unit during rendering. In this embodiment, an entirety of the single texture representation may be transcoded at load time. In an embodiment, the transcoding may be performed at install time when an application has been downloaded and installed onto a storage device of a computer. In an embodiment, at least a portion of the single texture representation may be streamed to a memory for transcoding. In an embodiment, such streaming may occur while another portion of the plurality of textures is being rendered.

In operation 104, the at least a portion of the plurality of textures with the hardware-supported compression format is output. In an embodiment, the at least a portion of the plurality of textures with the hardware-supported compression format may be output to storage. The storage may be memory local to the device that performed the transcoding or memory remote from the device that performed the transcoding. In an embodiment, the at least a portion of the plurality of textures with the hardware-supported compression format may be output to the hardware for decompression. The hardware may filter the decompressed at least a portion of the plurality of textures. The hardware may further render the decompressed at least a portion of the plurality of textures (e.g. apply the decompressed portion of textures to an object in an image when rendering the image). In an embodiment, the decompression may be performed in real-time.

In an embodiment, the at least a portion of the plurality of textures may be output for further processing. For example, the output at least a portion of the plurality of textures may be interleaved to form at least one interleaved texture. In an embodiment, the output may include two or more textures (e.g. in different hardware-supported compressed formats), and the interleaving may be applied to the two or more textures to form the at least one interleaved texture. In an embodiment, the output may include two or more portions of at least one texture (e.g. in different hardware-supported compressed formats), and the interleaving may be applied to the two or more portions to form the at least one interleaved texture. In an embodiment, the hardware may access the at least one interleaved texture. In an embodiment, the hardware may access the at least one interleaved texture for rendering.

In an embodiment, shader code (or likewise software on the hardware) may identify an interleaved texture to access. The shader code can compute the locations of the texels to access in the interleaved texture. The shader code may then send these locations to the hardware. The hardware may then fetch the texels determined by the shader code and then may filter the fetched texels.

With respect to the present description of the method 100, the single texture representation may provide a higher compression ratio in comparison with the hardware-supported compression format, which may reduce the memory resources required to store the texture set and which may reduce the computing resources required for streaming any portions of the texture set. However, transcoding the single texture representation to textures in the hardware-supported compression format(s) may allow the hardware to be able to utilize the textures, including during real-time rendering.

Further embodiments will now be provided in the description of the subsequent figures. It should be noted that the embodiments disclosed herein with reference to the method 100 of FIG. 1 may apply to and/or be used in combination with any of the embodiments of the remaining figures below.

Figure 2:
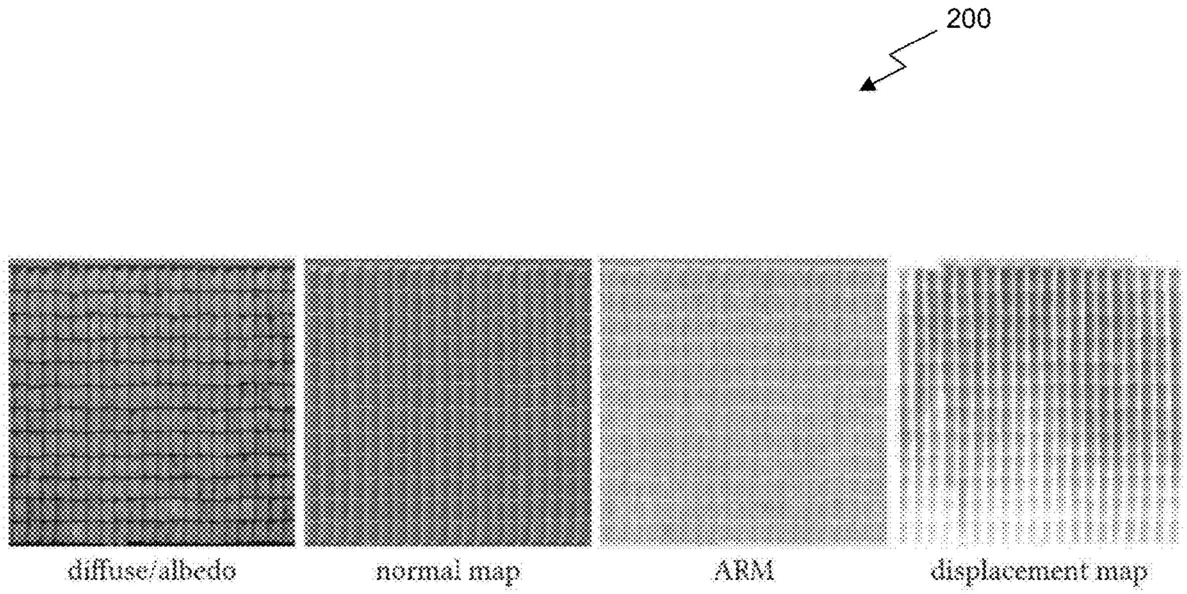
FIG. 2 illustrates an exemplary texture set, in accordance with an embodiment.

FIG. 2 illustrates an exemplary texture set 200, in accordance with an embodiment. It should be noted that the texture set 200 shown and described is set forth for illustrative purposes only. The present disclosure is applicable to texture sets that have any combination and number of different textures (e.g. representing different materials).

In the example shown, the texture set includes four different textures, consisting of a diffuse map, a normal map, an ARM (ambient occlusion, roughness, metalness) texture, and a displacement map. The texture set represents a ceramic roof material. This exemplary texture set may be compressed to form a single (compressed) representation of the texture set, which in turn may be transcoded in accordance with the method 100 of FIG. 1 described above.

Figure 3:
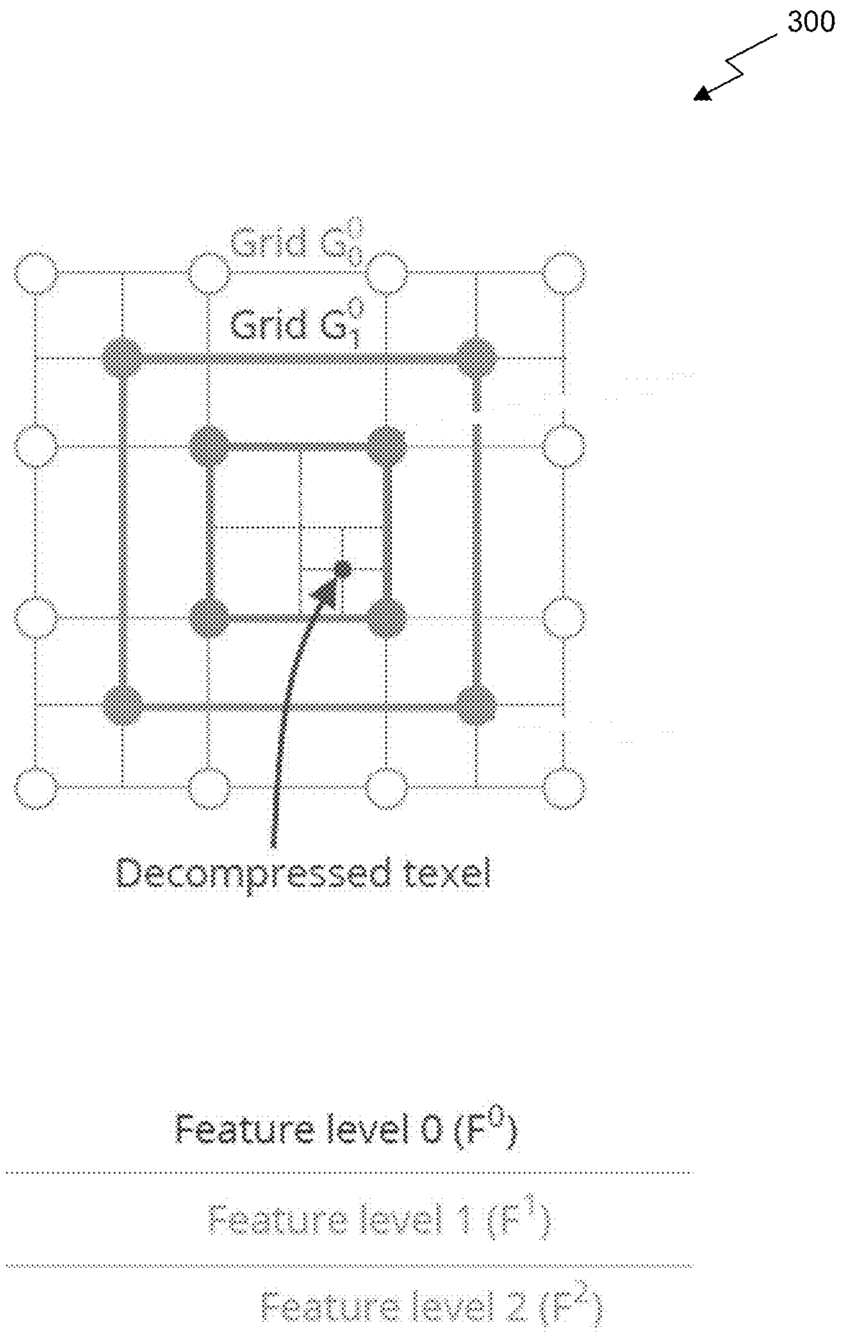
FIG. 3 illustrates an exemplary compressed representation of a texture set as a pyramid of a plurality of feature levels which allows for decompression of only a portion thereof, in accordance with an embodiment.

FIG. 3 illustrates an exemplary compressed representation 300 of a texture set as a pyramid of a plurality of feature levels, in accordance with an embodiment. The compressed representation 300 shown is one embodiment of the result of a texture compression method when applied to a texture set. Furthermore, while the compressed representation 300 as shown and described correlates with 2D textures, it should be noted that the concepts described may be extended to textures with greater dimensions. This compressed representation 300 may be one embodiment of the single texture representation disclosed in FIG. 1, which may be partially or fully transcoded into at least a portion of the textures in the texture set with a hardware-supported compression format, in accordance with the method 100 of FIG. 1.

As mentioned, the compressed representation 300 is a pyramid of multiple feature levels $F_j$, with each level, j, comprising a pair of 2D grids, $$G_0^j \text{ and } G_1^j.$$

The grids' cells store feature vectors of quantized latent values, which are utilized to predict multiple mip levels of the original texture set. In an embodiment, each feature level of the plurality of feature levels may represent a plurality of mip levels. The sharing of features across two or more mip levels lowers the storage cost of a traditional mipmap chain. Furthermore, within a feature level, grid $G_0$ is at a higher resolution, which helps preserve high-frequency details, while $G_1$ is at a lower resolution, improving the reconstruction of low-frequency content, such as color and smooth gradients. To this end, in an embodiment, a resolution of the grids may be reduced across the plurality of feature levels, from a top feature level of the pyramid to a bottom feature level of the pyramid. In an embodiment, a resolution of the grids may be less than a resolution of the plurality of textures in the texture set prior to compression.

Table 1 illustrates the exemplary feature levels and grid resolutions for a 1024×1024 texture set. The resolution of the grids is significantly lower than the texture resolution, resulting in a highly compressed representation of the entire mip chain. Typically, a feature level represents two mip levels, with some exceptions; the first feature level must represent all higher resolution mips (levels 0 to 3), and the last feature level represents the bottom three mip levels, as it cannot be further downsampled.

TABLE 1

| Feature level $F^j$ | $G_0^j$ grid resolution | $G_1^j$ grid resolution | Predicted mip levels |
|---|---|---|---|
| 0 | 256 × 256 | 128 × 128 | 0, 1, 2, 3 |
| 1 | 64 × 64 | 32 × 32 | 4, 5 |
| 2 | 16 × 16 | 8 × 8 | 6, 7 |
| 3 | 4 × 4 | 2 × 2 | 8, 9, 10 |

In an embodiment, the 2D grids may store data that can be used during the texture transcoding of the method 100 of FIG. 1, and in particular that can be used to transcode at least a portion of an image or texture.

Figure 4:
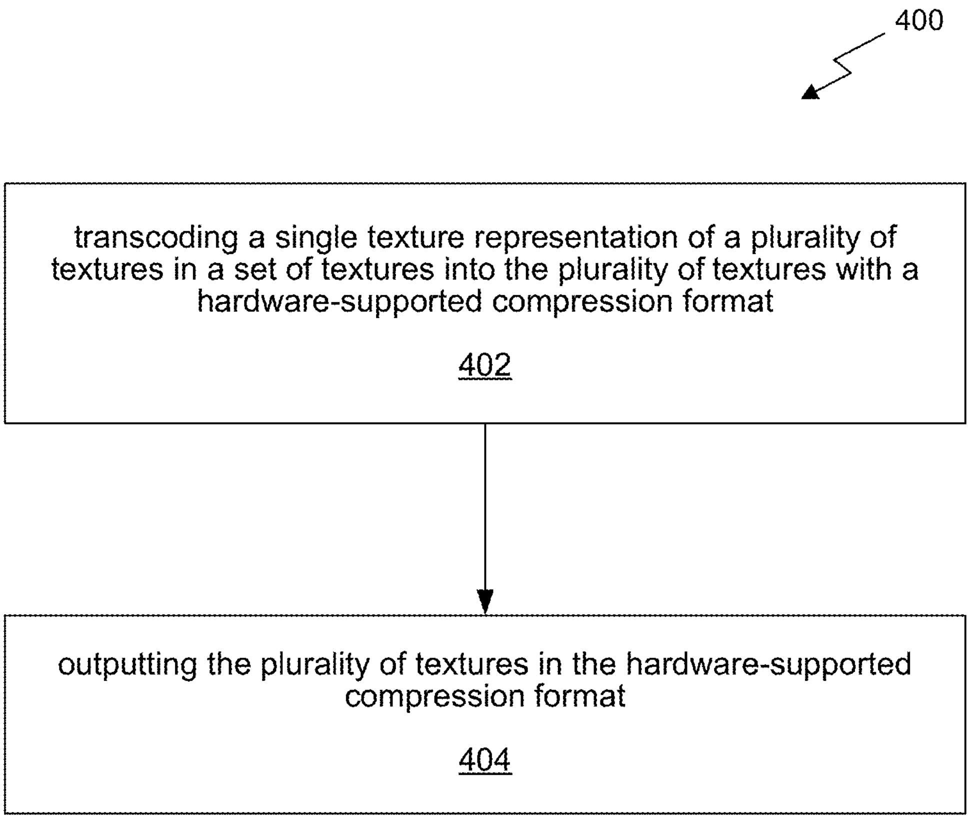
FIG. 4 illustrates a flowchart of a method for transcoding a single texture representation of a texture set to a plurality of textures having a same hardware-supported compression format, in accordance with an embodiment.

FIG. 4 illustrates a flowchart of a method 400 for transcoding a single texture representation of a texture set to a plurality of textures having a same hardware-supported compression format, in accordance with an embodiment. The method 400 may be carried in the context of the method 100 of FIG. 1. It should be noted that the definitions and descriptions provided above may apply to the present method 400.

In operation 402, a single texture representation of a plurality of textures in a set of textures is transcoded into the plurality of textures with a hardware-supported compression format. This may be performed according to operation 102 of FIG. 1. For example, in the present embodiment, an entirety of the single texture representation may be transcoded into the plurality of textures with the hardware-supported compression format. In an embodiment, each of the textures in the texture set may be independently compressed in the hardware-supported compression format to form a plurality of compressed textures. In an embodiment, the single texture representation may be transcoded at load time. In an embodiment, the single texture representation may be transcoded when streamed to hardware.

In operation 404, the plurality of textures in the hardware-supported compression format are output. This may be performed according to operation 104 of FIG. 1. In an embodiment, the plurality of textures in the hardware-supported compression format may be output to a storage (e.g. for access by the hardware, or for subsequent interleaving per FIG. 6). In another embodiment, the plurality of textures with the hardware-supported compression format may be directly output to the hardware for decompression thereof. In any case, the hardware is configured to decompress the (e.g. interleaved) plurality of textures in the hardware-supported compression format (e.g. using hardware decompressors) for rendering thereof. In an embodiment, the hardware may cache the decompressed textures in a cache hierarchy of the hardware. In an embodiment, the hardware may filter the decompressed textures using a texture unit of the hardware. The filtering may include stochastic filtering.

Exemplary Transcoding Process for the Single Texture Representation

In an embodiment, a single texture representation decoder runs at texel rate, which means that decompression outputs a single texel worth of material properties, i.e., a decompressed fat texel. Many texture compression formats encode texels in 4×4 texels blocks, independently of other blocks. Each block may store two endpoints, which may be, e.g., colors or gray scale values, depending on format. In addition, each texel inside the 4×4 block stores an n-bit index that encodes the color that each texel will decompress. Assuming the endpoints colors are $Co_0$ and $C_1$, decoding in the very simplest way can be done per Equation 1.

$$C_0 + \frac{C_1 - C_0}{2^n - 1} i(x, y) \quad \text{Equation 1}$$

where n is the number of bits for the per-texel index, which is denoted by i(x,y) for a certain texel (x,y) inside the block. This process "creates" $2^n$ colors (or $2^n$ grayscales, or a $2^n$ palette, etc., depending on the format of $C_0$ and $C_1$) from $C_0$ to $C_1$ using linear interpolation, and the per-pixel index, i(x,y), selects one of these for the texel at (x,y). This is presently described in the simplest form, but this type of interpolation can be done with more accuracy as desired. It should also be noted that ASTC, ETC1, and ETC2 may "create" their colors differently, but the present embodiments disclosed herein may be similarly applied thereto.

For BC7, there are 8 different modes. Without loss of generality, but for the sake of simplicity, we will focus just on mode 6 to start with. In general, mode 6 gives the most benefits for typical use cases. Mode 6 in BC7 has RGBA for the endpoints with 7 bits per channel per endpoint, i.e., each endpoint uses 4*7=28 bits, and there is also a shared least significant bit (LSB) for the two endpoints. The per-pixel indices each use 4 bits.

In an embodiment, the decoder may predict BC7 mode 6 blocks, i.e., it may transcode from the single texture representation of the texture set to BC7, mode 6. One way of accomplishing this while still running the decoder per texel mentioned above is to output 3N channels (instead of N) for each texel in a 4×4 block, where the first 2N channels represent the per-block endpoints, and the remaining N channels represent the per-texel indices. The effective per-block endpoints can be then calculated by averaging the 4×4 pairs of N of endpoints into one pair of endpoints, followed by quantization of per-block endpoints and per-texel indices.

In another embodiment, the network may run at a per-4×4-texel-block rate, with a single decoder invocation outputting 4×4*N per-texel indices, and N pairs of endpoints, where N is the number of material channels. However, to achieve good quality this embodiment may significantly increase the size of the last layer, and possibly of the remaining layers too.

Figure 5:
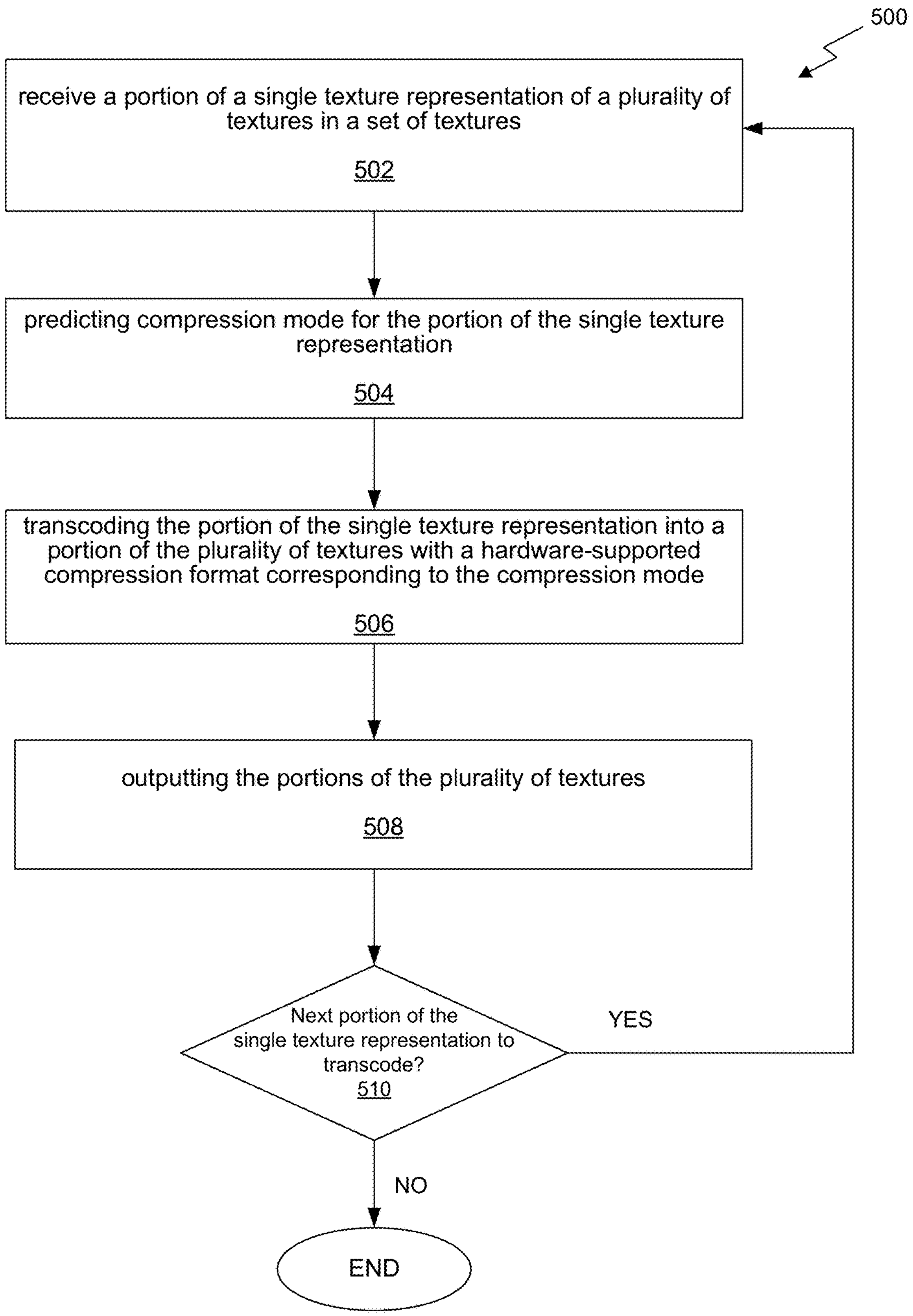
FIG. 5 illustrates a flowchart of a method for transcoding a portion of a single texture representation of a texture set to a portion of a plurality of textures with a hardware-supported compression format, in accordance with an embodiment.

FIG. 5 illustrates a flowchart of a method 500 for transcoding a portion of a single texture representation of a texture set to a portion of a plurality of textures with a hardware-supported compression format, in accordance with an embodiment. The method 500 may be carried in the context of the method 100 of FIG. 1. For example, as described herein, the method 500 may be carried out to transcode one portion of the single texture representation that has been streamed in, or otherwise that is requested on-demand by the hardware. In another embodiment described herein, the method 500 may be carried out to transcode different portions of the single texture representation to different portions of the plurality of textures with different hardware-supported compression formats. It should be noted that the definitions and descriptions provided above may apply to the present method 500.

In operation 502, a portion of a single texture representation of a plurality of textures in a set of textures is received. In an embodiment, the portion may be received when streamed to hardware. In another embodiment, the portion may be received when requested on-demand by the hardware.

In operation 504, a compression mode for the portion of the single texture representation is predicted. In an embodiment, the compression mode may be predicted using a neural network. In an embodiment, a compression format may first be predicted (e.g. by the neural network) from among a plurality of available compression formats (e.g. BCx, ETCx, etc.) and then a mode of that compression format may further be predicted. In an embodiment, the compression mode may be predicted from among a plurality of available compression modes for a select compression format (e.g. available compression modes for BC7).

In operation 506, the portion of the single texture representation is transcoded into a portion of the plurality of textures with a hardware-supported compression format corresponding to the compression mode. In an embodiment, the transcoding may be performed using the neural network that made the prediction or using an additional neural network.

In operation 508, the portion of the plurality of textures with the hardware-supported compression format is output. For example, the portion of the plurality of textures with the hardware-supported compression format may be output to a storage (e.g. for access by the hardware, or for subsequent interleaving per FIG. 6). In another example, the portion of the plurality of textures with the hardware-supported compression format may be directly output to the hardware for decompression thereof. In any case, the hardware is configured to decompress the (e.g. interleaved) portion of textures in the hardware-supported compression format (e.g. using hardware decompressors) for rendering thereof. In an embodiment, the hardware may cache the decompressed texture portion in a cache hierarchy of the hardware. In an embodiment, the hardware may filter the decompressed texture portion using a texture unit of the hardware. The filtering may include stochastic filtering, or one of bilinear, trilinear, or anisotropic filtering supported by the hardware.

It is then determined in decision 510 whether a next portion of the single texture representation has been received for transcoding. In response to determining that a next portion of the single texture representation has been received for transcoding (i.e. operation 502 has been repeated for a new portion of the single texture representation), the method 500 returns to operation 504 to predict a compression mode for newly received portion of the single texture representation, and then on to operation 506 to transcode the newly received portion of the single texture representation accordingly, and further on to operation 508 to output a result of the transcoding. In this way, different portions of the single texture representation may be transcoded to different portions of the textures (e.g. in a streaming or on-demand manner). Further, the different portions of the textures may or may not be transcoded with different hardware-supported compression formats, per the configured implementation.

Exemplary Transcoding Process for a Portion of the Single Texture Representation Following the exemplary transcoding process for the single texture representation disclosed above, supporting all modes for BC7 should also be possible, especially if the neural network runs at per-BC-block rate. In this embodiment, the neural network may be trained to predict the block mode, with the rest of the channels may then be "interpreted" on a case-by-case basis, depending on the selected mode. As another option, a primary neural network could predict the mode for each block, and then a specialized secondary neural network could be trained/invoked to predict the data for all of the blocks with a specific block type.

Figure 6:
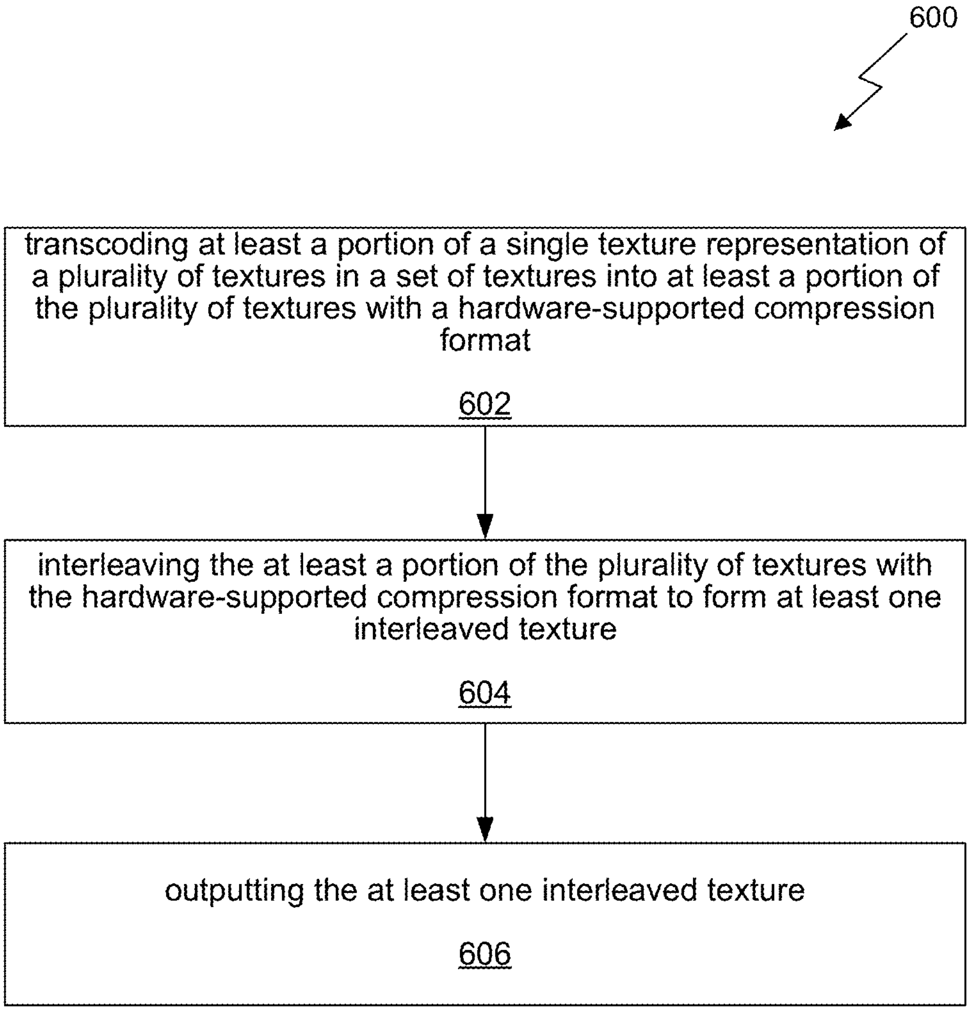
FIG. 6 illustrates a flowchart of a method for generating an interleaved texture, in accordance with an embodiment.

FIG. 6 illustrates a flowchart of a method 600 for generating an interleaved texture, in accordance with an embodiment. As described herein, the method 600 may be carried out as an extension to the method 100 of FIG. 1, the method 400 of FIG. 4 and/or the method 500 of FIG. 5. It should be noted that the definitions and descriptions provided above may apply to the present method 600.

In operation 602, at least a portion of a single texture representation of a plurality of textures in a set of textures is transcoded into at least a portion of the plurality of textures with a hardware-supported compression format. This may include transcoding an entirety of the single texture representation into the plurality of textures with the hardware-supported compression format (per FIG. 4), or this may include transcoding one or more portions of the single texture representation into portions of the plurality of textures with a corresponding hardware-supported compression format (per FIG. 5). In an embodiment, the portions of the plurality of textures may be the same 2D rectangle or 3D box of pixels, but may represent different layers or channels in the texture set.

In operation 604, the at least a portion of the plurality of textures with the hardware-supported compression format are interleaved to form at least one interleaved texture. Interleaving refers to alternating portions (e.g. blocks) from the textures that are compressed in the hardware-supported compression formats. One example of interleaving textures is disclosed in U.S. Pat. No. 11,823,318, filed Jun. 4, 2021 and entitled "Techniques for interleaving textures," which is hereby incorporated by reference in its entirety.

In operation 606, the at least one interleaved texture is output. For example, the at least one interleaved texture may be output to a storage, for example to be accessed by the hardware. In an embodiment, the at least one interleaved texture may be output directly to the hardware. In any case, the hardware is configured to access one or more select portions of the at least one interleaved texture, decompress the accessed portion(s), and then render the decompressed portion(s). By interleaving the textures as described above, incoherent accesses may become faster when different textures or texture portions are accessed. For example, instead of requiring separate texture accesses to a same texel coordinate (x,y) of the different textures, the texture unit of the hardware can be configured to accept a specialized lookup that returns values for all of the textures at the texel coordinate (x,y) with just a single request to the texture unit.

Figure 7A:
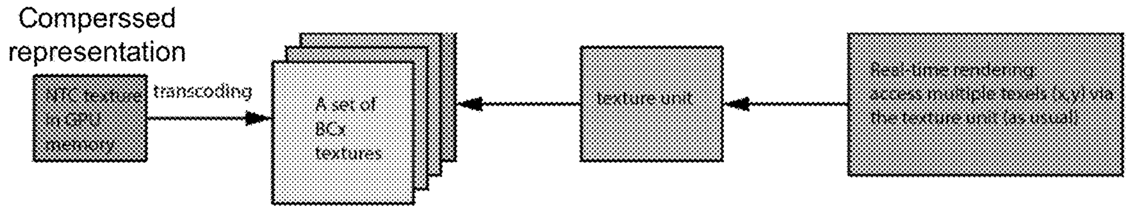
FIG. 7A-7B illustrate different implementations of processing a single texture representation of a set of textures, in accordance with various embodiments.
Figure 7B:
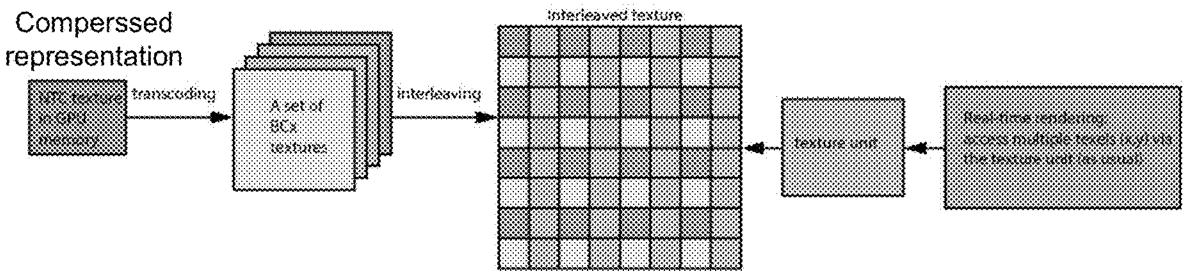

FIG. 7A-7B illustrate different implementations of processing a single texture representation of a set of textures, in accordance with various embodiments.

In FIG. 7A, at least a portion of a single texture representation of a plurality of textures in a set of textures is transcoded into at least a portion of the plurality of textures with a hardware-supported compression format. The at least a portion of the single texture representation may be streamed in for transcoding (as needed), or transcoded at install time or load time. The at least a portion of the single texture representation is transcoded into the at least a portion of the plurality of textures with the hardware-supported compression format (shown as BCx by way of example only). During real-time rendering, shader code requests texture accesses via a texture unit which causes the hardware to perform decompression, caching, and possibly filtering on the at least a portion of the plurality of textures with the hardware-supported compression format.

In FIG. 7B, at least a portion of a single texture representation of a plurality of textures in a set of textures is transcoded into at least a portion of the plurality of textures with a hardware-supported compression format, where such portion(s) in the hardware-supported compression format are then interleaved into at least one interleaved texture. The at least a portion of the single texture representation may be streamed in for transcoding (as needed), or transcoded at install time or load time. When the hardware supports interleaving in its texture unit, the hardware can then access select parts of the at least one interleaved texture as desired, to decompress, cache, and possibly filter the texture portion (s) corresponding to those select parts. In another embodiment (e.g. when the hardware does not support interleaving in its texture unit), the shader code may perform the deinterleaving by computing the texel locations in the interleaved texture to be accessed) and then informing the hardware of those locations so that the hardware can fetch the texels determined by the shader code and then filter the fetched texels.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 815 for a deep learning or neural learning system are provided below in conjunction with FIGS. 8A and/or 8B.

In at least one embodiment, inference and/or training logic 815 may include, without limitation, a data storage 801 to store forward and/or output weight and/or input/output data corresponding to neurons or layers of a neural network trained and/or used for inferencing in aspects of one or more embodiments. In at least one embodiment data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 801 may be included with other on-chip or off-chip data storage, including a processor's L1, L2, or L3 cache or system memory.

In at least one embodiment, any portion of data storage 801 may be internal or external to one or more processors or other hardware logic devices or circuits. In at least one embodiment, data storage 801 may be cache memory, dynamic randomly addressable memory ("DRAM"), static randomly addressable memory ("SRAM"), non-volatile memory (e.g., Flash memory), or other storage. In at least one embodiment, choice of whether data storage 801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 may include, without limitation, a data storage 805 to store backward and/or output weight and/or input/output data corresponding to neurons or layers of a neural network trained and/or used for inferencing in aspects of one or more embodiments. In at least one embodiment, data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 805 may be included with other on-chip or off-chip data storage, including a processor's L1, L2, or L3 cache or system memory. In at least one embodiment, any portion of data storage 805 may be internal or external to on one or more processors or other hardware logic devices or circuits. In at least one embodiment, data storage 805 may be cache memory, DRAM, SRAM, non-volatile memory (e.g., Flash memory), or other storage. In at least one embodiment, choice of whether data storage 805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 801 and data storage 805 may be separate storage structures. In at least one embodiment, data storage 801 and data storage 805 may be same storage structure. In at least one embodiment, data storage 801 and data storage 805 may be partially same storage structure and partially separate storage structures. In at least one embodiment, any portion of data storage 801 and data storage 805 may be included with other on-chip or off-chip data storage, including a processor's L1, L2, or L3 cache or system memory.

In at least one embodiment, inference and/or training logic 815 may include, without limitation, one or more arithmetic logic unit(s) ("ALU(s)") 810 to perform logical and/or mathematical operations based, at least in part on, or indicated by, training and/or inference code, result of which may result in activations (e.g., output values from layers or neurons within a neural network) stored in an activation storage 820 that are functions of input/output and/or weight parameter data stored in data storage 801 and/or data storage 805. In at least one embodiment, activations stored in activation storage 820 are generated according to linear algebraic and or matrix-based mathematics performed by ALU(s) 810 in response to performing instructions or other code, wherein weight values stored in data storage 805 and/or data 801 are used as operands along with other values, such as bias values, gradient information, momentum values, or other parameters or hyperparameters, any or all of which may be stored in data storage 805 or data storage 801 or another storage on or off-chip. In at least one embodiment, ALU(s) 810 are included within one or more processors or other hardware logic devices or circuits, whereas in another embodiment, ALU(s) 810 may be external to a processor or other hardware logic device or circuit that uses them (e.g., a co-processor). In at least one embodiment, ALUs 810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 801, data storage 805, and activation storage 820 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 820 may be cache memory, DRAM, SRAM, non-volatile memory (e.g., Flash memory), or other storage. In at least one embodiment, activation storage 820 may be completely or partially within or external to one or more processors or other logical circuits. In at least one embodiment, choice of whether activation storage 820 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 815 illustrated in FIG. 8A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8A may be used in conjunction with central processing unit ("CPU") hardware, graphics processing unit ("GPU") hardware or other hardware, such as field programmable gate arrays ("FPGAs").

Figure 8A:
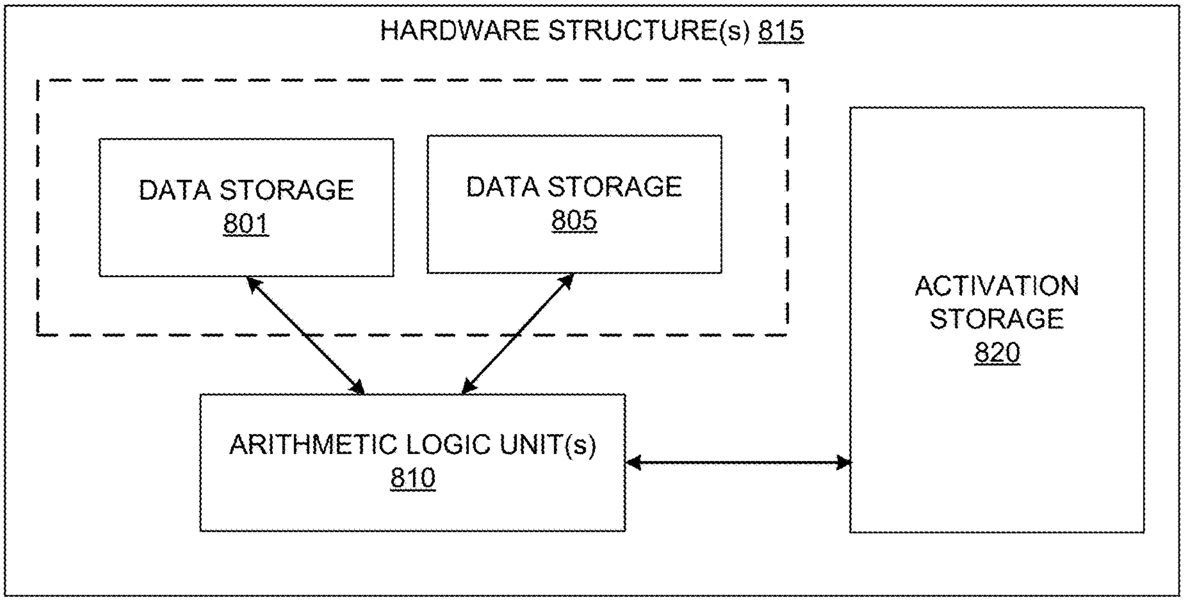
FIG. 8A illustrates inference and/or training logic, according to at least one embodiment.
Figure 8B:
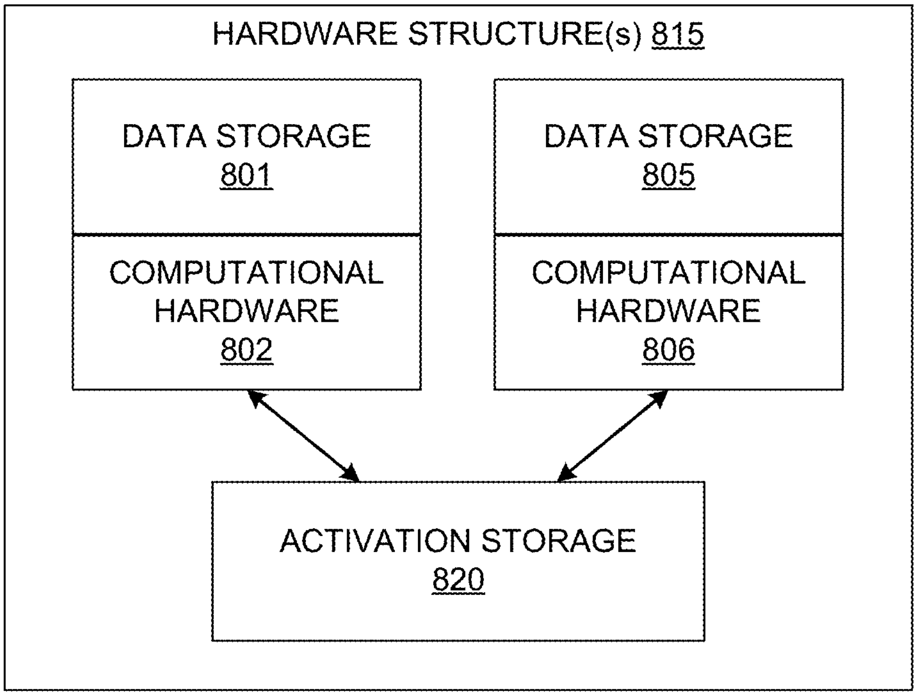
FIG. 8B illustrates inference and/or training logic, according to at least one embodiment.

FIG. 8B illustrates inference and/or training logic 815, according to at least one embodiment. In at least one embodiment, inference and/or training logic 815 may include, without limitation, hardware logic in which computational resources are dedicated or otherwise exclusively used in conjunction with weight values or other information corresponding to one or more layers of neurons within a neural network. In at least one embodiment, inference and/or training logic 815 illustrated in FIG. 8B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8B may be used in conjunction with central processing unit (CPU) hardware, graphics processing unit (GPU) hardware or other hardware, such as field programmable gate arrays (FPGAs). In at least one embodiment, inference and/or training logic 815 includes, without limitation, data storage 801 and data storage 805, which may be used to store weight values and/or other information, including bias values, gradient information, momentum values, and/or other parameter or hyperparameter information. In at least one embodiment illustrated in FIG. 8B, each of data storage 801 and data storage 805 is associated with a dedicated computational resource, such as computational hardware 802 and computational hardware 806, respectively. In at least one embodiment, each of computational hardware 806 comprises one or more ALUs that perform mathematical functions, such as linear algebraic functions, only on information stored in data storage 801 and data storage 805, respectively, result of which is stored in activation storage 820.

In at least one embodiment, each of data storage 801 and 805 and corresponding computational hardware 802 and 806, respectively, correspond to different layers of a neural network, such that resulting activation from one "storage/computational pair 801/802" of data storage 801 and computational hardware 802 is provided as an input to next "storage/computational pair 805/806" of data storage 805 and computational hardware 806, in order to mirror conceptual organization of a neural network. In at least one embodiment, each of storage/computational pairs 801/802 and 805/806 may correspond to more than one neural network layer. In at least one embodiment, additional storage/computation pairs (not shown) subsequent to or in parallel with storage computation pairs 801/802 and 805/806 may be included in inference and/or training logic 815.

Neural Network Training and Deployment

Figure 9:
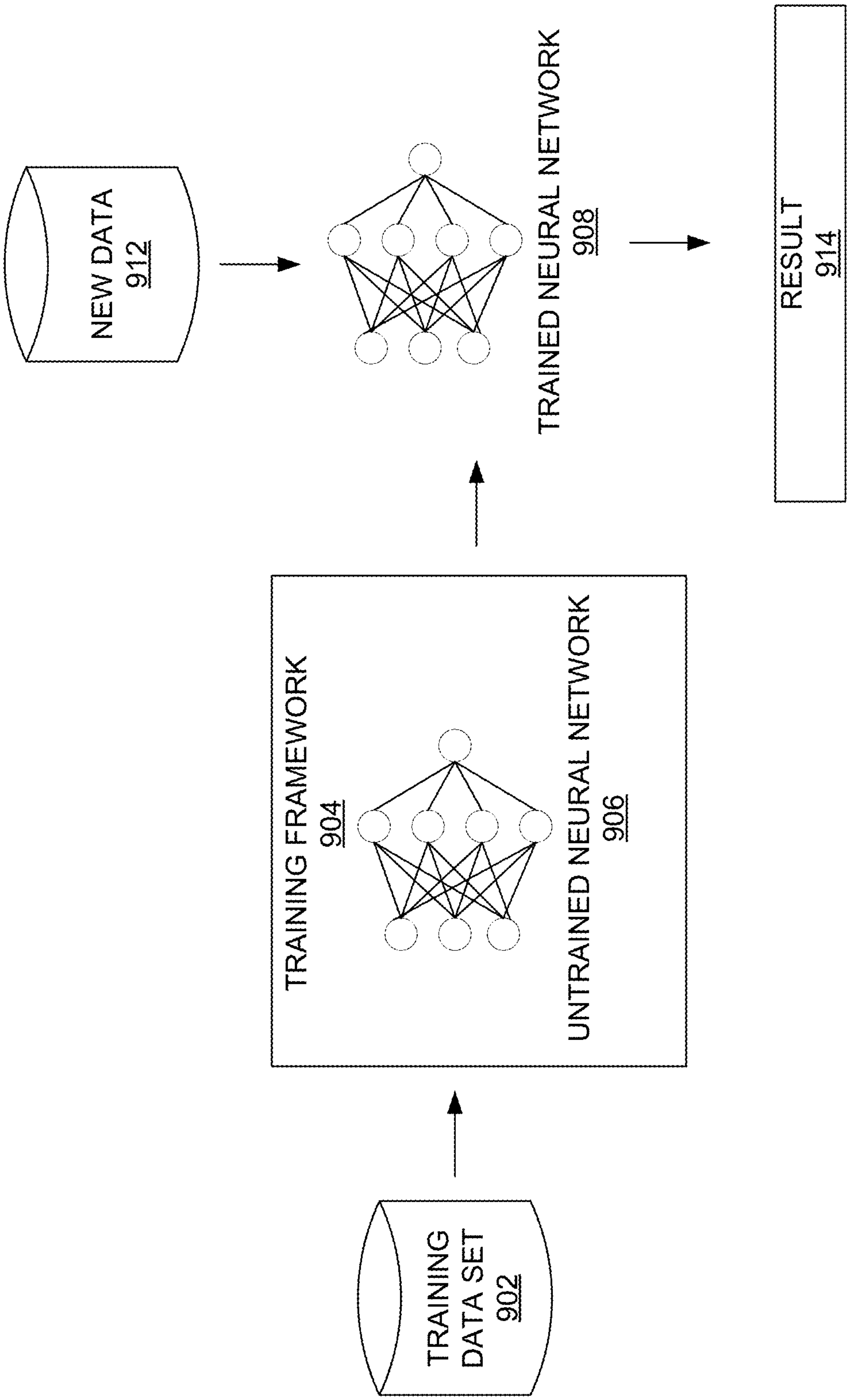
FIG. 9 illustrates training and deployment of a neural network, according to at least one embodiment.

FIG. 9 illustrates another embodiment for training and deployment of a deep neural network. In at least one embodiment, untrained neural network 906 is trained using a training dataset 902. In at least one embodiment, training framework 904 is a PyTorch framework, whereas in other embodiments, training framework 904 is a Tensorflow, Boost, Caffe, Microsoft Cognitive Toolkit/CNTK, MXNet, Chainer, Keras, Deeplearning4j, or other training framework. In at least one embodiment training framework 904 trains an untrained neural network 906 and enables it to be trained using processing resources described herein to generate a trained neural network 908. In at least one embodiment, weights may be chosen randomly or by pre-training using a deep belief network. In at least one embodiment, training may be performed in either a supervised, partially supervised, or unsupervised manner.

In at least one embodiment, untrained neural network 906 is trained using supervised learning, wherein training dataset 902 includes an input paired with a desired output for an input, or where training dataset 902 includes input having known output and the output of the neural network is manually graded. In at least one embodiment, untrained neural network 906 is trained in a supervised manner processes inputs from training dataset 902 and compares resulting outputs against a set of expected or desired outputs. In at least one embodiment, errors are then propagated back through untrained neural network 906. In at least one embodiment, training framework 904 adjusts weights that control untrained neural network 906. In at least one embodiment, training framework 904 includes tools to monitor how well untrained neural network 906 is converging towards a model, such as trained neural network 908, suitable to generating correct answers, such as in result 914, based on known input data, such as new data 912. In at least one embodiment, training framework 904 trains untrained neural network 906 repeatedly while adjust weights to refine an output of untrained neural network 906 using a loss function and adjustment algorithm, such as stochastic gradient descent. In at least one embodiment, training framework 904 trains untrained neural network 906 until untrained neural network 906 achieves a desired accuracy. In at least one embodiment, trained neural network 908 can then be deployed to implement any number of machine learning operations.

In at least one embodiment, untrained neural network 906 is trained using unsupervised learning, wherein untrained neural network 906 attempts to train itself using unlabeled data. In at least one embodiment, unsupervised learning training dataset 902 will include input data without any associated output data or "ground truth" data. In at least one embodiment, untrained neural network 906 can learn groupings within training dataset 902 and can determine how individual inputs are related to untrained dataset 902. In at least one embodiment, unsupervised training can be used to generate a self-organizing map, which is a type of trained neural network 908 capable of performing operations useful in reducing dimensionality of new data 912. In at least one embodiment, unsupervised training can also be used to perform anomaly detection, which allows identification of data points in a new dataset 912 that deviate from normal patterns of new dataset 912.

In at least one embodiment, semi-supervised learning may be used, which is a technique in which in training dataset 902 includes a mix of labeled and unlabeled data. In at least one embodiment, training framework 904 may be used to perform incremental learning, such as through transferred learning techniques. In at least one embodiment, incremental learning enables trained neural network 908 to adapt to new data 912 without forgetting knowledge instilled within network during initial training.

Data Center

Figure 10:
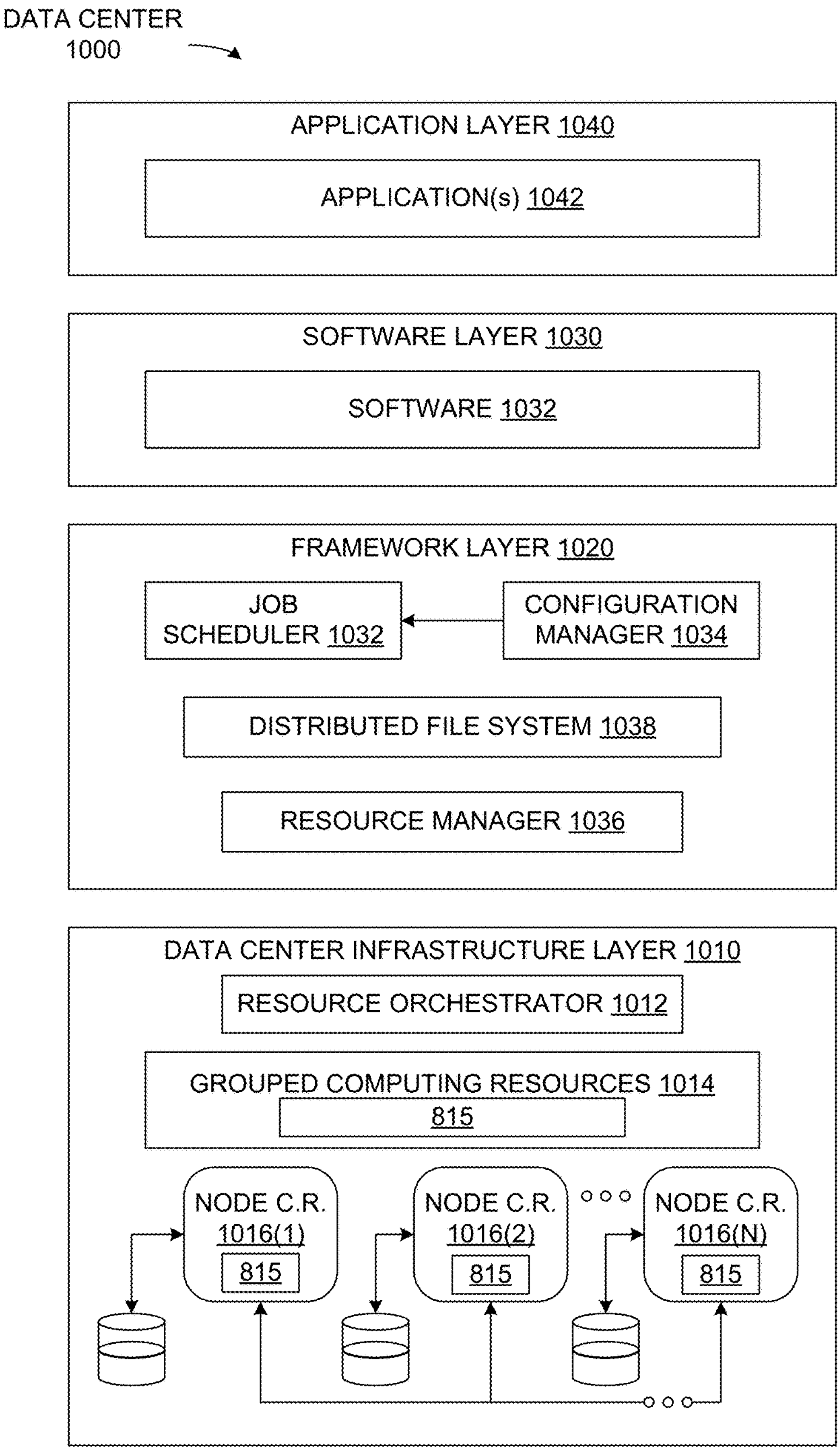
FIG. 10 illustrates an example data center system, according to at least one embodiment.

FIG. 10 illustrates an example data center 1000, in which at least one embodiment may be used. In at least one embodiment, data center 1000 includes a data center infrastructure layer 1010, a framework layer 1020, a software layer 1030 and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). Separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for data center 1000. In at least one embodiment, resource orchestrator may include hardware, software or some combination thereof.

In at least one embodiment, as shown in FIG. 10, framework layer 1020 includes a job scheduler 1032, a configuration manager 1034, a resource manager 1036 and a distributed file system 1038. In at least one embodiment, framework layer 1020 may include a framework to support software 1032 of software layer 1030 and/or one or more application(s) 1042 of application layer 1040. In at least one embodiment, software 1032 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. In at least one embodiment, configuration manager 1034 may be capable of configuring different layers such as software layer 1030 and framework layer 1020 including Spark and distributed file system 1038 for supporting large-scale data processing. In at least one embodiment, resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. In at least one embodiment, resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. one or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center.

In at least one embodiment, data center 1000 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1000. In at least one embodiment, trained machine learning models corresponding to one or more neural networks may be used to infer or predict information using resources described above with respect to data center 1000 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 815 are used to perform inferencing and/or training operations associated with one or more embodiments. In at least one embodiment, inference and/or training logic 815 may be used in system FIG. 10 for inferencing or predicting operations based, at least in part, on weight parameters calculated using neural network training operations, neural network functions and/or architectures, or neural network use cases described herein.

As described herein, a method, computer readable medium, and system are disclosed to provide for transcoding of a single texture representation of a texture set. At least one neural network may be used for transcoding the single texture representation, involving the performance of inferencing operations and for providing inferenced data. The neural network may be stored (partially or wholly) in one or both of data storage 801 and 805 in inference and/or training logic 815 as depicted in FIGS. 8A and 8B. Training and deployment of the neural network may be performed as depicted in FIG. 9 and described herein. Distribution of the neural network may be performed using one or more servers in a data center 1000 as depicted in FIG. 10 and described herein.

What is claimed is:

1. A method, comprising:

at a device:

accessing a single texture representation of a texture set comprised of a plurality of different textures, each texture in the texture set including a plurality of parameters that define at least one property of an object surface;

transcoding by at least one neural network at least a portion of the single texture representation into at least a portion of the plurality of different textures with a hardware-supported compression format; and outputting the at least a portion of the plurality of different textures with the hardware-supported compression format.

2. The method of claim 1, wherein the single texture representation is a compressed representation of the plurality of different textures included in the texture set.

3. The method of claim 2, wherein the compressed representation is generated using at least one compression method.

4. The method of claim 2, wherein the compressed representation is generated using at least two compression methods.

5. The method of claim 1, wherein the single texture representation is learned using a neural network.

6. The method of claim 5, wherein the single texture representation is further generated by applying an entropy encoding to an output of the neural network.

7. The method of claim 1, wherein the single texture representation is a pyramid of a plurality of feature levels, wherein each feature level of the plurality of feature levels includes a plurality of grids.

8. The method of claim 1, wherein the texture set represents a material.

9. The method of claim 8, wherein each texture of the plurality of different textures represents a different property of the material.

10. The method of claim 1, wherein at least one texture of the plurality of different textures includes a plurality of channels.

11. The method of claim 1, wherein the hardware-supported compression format is a block compression format.

12. The method of claim 11, wherein the block compression format is a BCx format.

13. The method of claim 11, wherein the block compression format is one of:

an ETCx format, or an ASTC format.

14. The method of claim 1, wherein the transcoding is performed at load time when loading graphics data to memory for use by a processing unit during rendering.

15. The method of claim 14, wherein an entirety of the single texture representation is transcoded at load time.

16. The method of claim 1, wherein the transcoding is performed at install time when an application has been downloaded and installed onto a storage device of a computer.

17. The method of claim 1, wherein the at least a portion of the single texture representation is streamed to a memory for transcoding.

18. The method of claim 17, wherein a portion of the single texture representation is streamed to the memory for transcoding while a portion of the plurality of different textures is being rendered.

19. The method of claim 1, wherein the single texture representation enables random access such that only a portion of the single texture representation is transcoded.

20. The method of claim 19, wherein the portion of the single texture representation is a block of texels included in the single texture representation.

21. The method of claim 1, wherein at least two different portions of the single texture representation are transcoded to at least two different portions of the plurality of textures with a same hardware-supported compression format.

22. The method of claim 1, wherein at least two different portions of the single texture representation are transcoded to at least two different portions of the plurality of textures with different hardware-supported compression formats.

23. The method of claim 1, wherein the transcoding is performed using a single neural network.

24. The method of claim 1, wherein the transcoding is performed using at least two neural networks.

25. The method of claim 1, wherein the at least a portion of the plurality of different textures with the hardware-supported compression format is output to the hardware for decompression.

26. The method of claim 25, wherein the hardware further renders the decompressed at least a portion of the plurality of different textures.

27. The method of claim 1, further comprising, at the device:

interleaving the output at least a portion of the plurality of different textures to form at least one interleaved texture.

28. The method of claim 27, wherein the hardware accesses the at least one interleaved texture for rendering.

29. The method of claim 28, wherein shader code accesses the at least one interleaved texture, computes which texel locations to access and sends the locations to the hardware for use in fetching the texels.

30. The method of claim 1, wherein transcoding at least a portion of the single texture representation into at least a portion of the plurality of different textures with a hardware-supported compression format includes:

independently transcoding each texture of the plurality of different textures into the hardware-supported compression format to form a plurality of different textures in the hardware-supported compression format.

31. The method of claim 1, wherein transcoding at least a portion of the single texture representation into at least a portion of the plurality of different textures with a hardware-supported compression format includes:

transcoding a same region in each texture of the plurality of different textures to form regions across the plurality of different textures in the hardware-supported compression format.

32. A system, comprising:

a non-transitory memory storage comprising instructions; and one or more processors in communication with the memory, wherein the one or more processors execute the instructions to:

access a single texture representation of a texture set comprised of a plurality of different textures, each texture in the texture set including a plurality of parameters that define at least one property of an object surface;

transcode by at least one neural network at least a portion of the single texture representation into at least a portion of the plurality of different textures with a hardware-supported compression format; and output the at least a portion of the plurality of different textures with the hardware-supported compression format.

33. The system of claim 32, wherein the single texture representation is a compressed representation of the plurality of different textures included in the texture set.

34. The system of claim 32, wherein the single texture representation is learned using a neural network.

35. The system of claim 32, wherein the hardware-supported compression format is a block compression format.

36. The system of claim 32, wherein the transcoding is performed at load time when loading graphics data to memory for use by a processing unit during rendering.

37. The system of claim 36, wherein an entirety of the single texture representation is transcoded at load time.

38. The system of claim 32, wherein the transcoding is performed at install time when an application has been downloaded and installed onto a storage device of a computer.

39. The system of claim 32, wherein the at least a portion of the single texture representation is streamed to a memory for transcoding.

40. The system of claim 39, wherein a portion of the single texture representation is streamed to the memory for transcoding while a portion of the plurality of different textures is being rendered.

41. The system of claim 32, wherein the transcoding is performed using at least one neural network.

42. The system of claim 32, wherein the at least a portion of the plurality of different textures with the hardware-supported compression format is output to the hardware for decompression.

43. The system of claim 42, wherein the hardware further renders the decompressed at least a portion of the plurality of different textures.

44. The system of claim 32, wherein the one or more processors further execute the instructions to:

interleave the output at least a portion of the plurality of different textures to form at least one interleaved texture.

45. The system of claim 44, wherein the hardware accesses the at least one interleaved texture.

46. A non-transitory computer-readable media storing computer instructions which when executed by one or more processors of a device cause the device to:

access a single texture representation of a texture set comprised of a plurality of different textures, each texture in the texture set including a plurality of parameters that define at least one property of an object surface;

transcode by at least one neural network at least a portion of the single texture representation into at least a portion of the plurality of different textures with a hardware-supported compression format; and output the at least a portion of the plurality of different textures with the hardware-supported compression format.

47. The non-transitory computer-readable media of claim 46, wherein the transcoding is performed using a single neural network.

48. The non-transitory computer-readable media of claim 46, wherein the at least a portion of the plurality of different textures with the hardware-supported compression format is output to the hardware for decompression.

49. The non-transitory computer-readable media of claim 48, wherein the hardware further renders the decompressed at least a portion of the plurality of different textures.

50. The non-transitory computer-readable media of claim 46, wherein the one or more processors further execute the instructions to:

interleave the output at least a portion of the plurality of different textures to form at least one interleaved texture.

51. The non-transitory computer-readable media of claim 50, wherein the hardware accesses the at least one interleaved texture.

* * * * *